(12) United States Patent
Nikitopoulos et al.

(10) Patent No.: US 10,374,841 B2
(45) Date of Patent: Aug. 6, 2019

(54) PARALLEL PROCESSING OF SPHERE DECODERS AND OTHER VECTOR FINDING APPROACHES USING TREE SEARCH

(71) Applicant: UNIVERSITY OF SURREY, Surrey (GB)

(72) Inventors: Konstantinos Nikitopoulos, Surrey (GB); Rahim Tafazolli, Surrey (GB)

(73) Assignee: UNIVERSITY OF SURREY, Surrey (GB)

( * ) Notice: Subject to any disclaimer, the term of this patent is extended or adjusted under 35 U.S.C. 154(b) by 46 days.

(21) Appl. No.: 15/735,948

(22) PCT Filed: Jun. 7, 2016

(86) PCT No.: PCT/GB2016/051675
§ 371 (c)(1),
(2) Date: Dec. 12, 2017

(87) PCT Pub. No.: WO2016/198845
PCT Pub. Date: Dec. 15, 2016

(65) Prior Publication Data
US 2018/0176049 A1   Jun. 21, 2018

(30) Foreign Application Priority Data

Jun. 8, 2015  (GB) .................................. 1509910.4

(51) Int. Cl.
*H03D 1/00* (2006.01)
*H04L 25/03* (2006.01)
*G06F 16/22* (2019.01)
*G06F 16/2458* (2019.01)
*H04L 1/00* (2006.01)
*H04B 7/0413* (2017.01)

(52) U.S. Cl.
CPC .... *H04L 25/03242* (2013.01); *G06F 16/2246* (2019.01); *G06F 16/2458* (2019.01); *H04L 1/0054* (2013.01); *H04B 7/0413* (2013.01); *H04L 1/0055* (2013.01); *H04L 25/03286* (2013.01)

(58) Field of Classification Search
CPC ............ H04L 25/03242; H04L 1/0054; H04L 1/0055; H04L 25/03286; G06F 16/2458; G06F 16/2246; H04B 7/0413
USPC ........................ 375/341, 340, 316, 295, 219
See application file for complete search history.

(56) References Cited

PUBLICATIONS

International Search Report and Written Opinion for PCT/GB2016/051675 dated Aug. 17, 2016.
(Continued)

*Primary Examiner* — Zewdu A Kassa
(74) *Attorney, Agent, or Firm* — Chang & Hale LLP (57) ABSTRACT

Apparatus and methods for finding a vector solution to a tree search problem are disclosed. In some embodiments, the apparatus and methods can be used for sphere decoding. The tree search is performed by: obtaining a tree graph; identifying a plurality of nodes in the tree graph that are likely to be part of the solution to the tree graph; partitioning the tree graph into a plurality of sub-trees, each sub-tree including one or more of the identified nodes; processing the plurality of sub-trees in parallel by allocating one or more of the processing elements to each of the sub-trees; and determining the solution based on results of the sub-tree processing.

15 Claims, 8 Drawing Sheets

(56) References Cited

PUBLICATIONS

Koo Jihun et al., "A parallel collaborative sphere decoder for a MIMO communication system," Journal of Communications and Networks, New York, NY, USA, IEEE, Dec. 1, 2014, vol. 16, No. 6, pp. 620-626.

K Nikitopoulos et al., "Multisphere: Massively Parallel Tree Search for Large Sphere Decoders," To Appear in Globecom 2016, Jan. 1, 2016.

PARALLEL PROCESSING OF SPHERE DECODERS AND OTHER VECTOR FINDING APPROACHES USING TREE SEARCH

TECHNICAL FIELD

The present invention relates to parallel processing of vector finding approaches using a tree search. More particularly, but not exclusively, the present invention relates to performing sphere decoding or encoding using a plurality of processing elements.

BACKGROUND OF THE INVENTION

The ever-increasing need for wireless capacity has recently triggered interest in switching from orthogonal to non-orthogonal signal transmission. When non-orthogonal signal transmission is allowed, interference occurs between different information streams. Examples of promising non-orthogonal approaches include traditional and distributed multi-antenna (MIMO) systems with aggressive spatial multiplexing, ultra dense network architectures, "Faster-than-Nyquist" signalling, non-orthogonal multiple access schemes and network coding. However, to deliver in practice the corresponding gains of non-orthogonal signal transmission as predicted in theory, it is necessary to be able to optimally, in the maximum-likelihood (ML) sense, demultiplex the mutually interfering information streams.

One well-known technique for optimally demultiplexing mutually interfering signals is sphere decoding, in which the corresponding exhaustive search problem is transformed to an equivalent tree search. However, the complexity of the sphere decoder increases exponentially with the number of interfering streams. The high complexity, in combination with the fact that the speed of traditional processors has reached a plateau in recent years, prohibits ML performance being achieved for a large number of interfering streams. Consequently, there has been interest in developing methods of parallelizing the sphere decoder which would enable the processing load to be divided into sub-processes that run on different processing elements. Sphere decoder parallelization is a very promising approach to reduce processing latency and power consumption. However, parallelizing the sphere decoder is not trivial. The efficiency of sphere decoding is dependent on the ability to early prune large parts of the sphere decoding tree without compromising optimality, and simple parallelization approaches can actually result in less efficient tree pruning, an increased number of calculations, and even increased processing latency.

The invention is made in this context.

SUMMARY OF THE INVENTION

According to a first aspect of the invention, there is provided a parallel-processing method of finding a vector solution to a tree search problem using a plurality of processing elements, the method comprising: obtaining a tree graph; identifying a plurality of nodes in the tree graph that are likely to be part of the solution to the tree graph; partitioning the tree graph into a plurality of sub-trees, each sub-tree including one or more of the identified nodes; processing the plurality of sub-trees in parallel by allocating one or more of the processing elements to each of the sub-trees; and determining the solution based on results of the sub-tree processing. In some embodiments according to the first aspect, the method can be used to find a plurality of vector solutions to the tree search problem. The solution to the tree search problem may be referred to as the wanted solution.

In some embodiments according to the first aspect, the method further comprises, for each one of a plurality of nodes in the tree graph, determining a metric of promise related to a likelihood of the node being part of the solution to the tree graph, wherein the plurality of nodes that are likely to be part of the solution to the tree graph are identified based on the determined metrics of promise. When the method is used to find a plurality of solutions, the metric of promise can be related to the likelihood of the node being part of at least one of the wanted solutions.

Alternatively, the method can further comprise processing the tree graph using a vector search method, to obtain a list of candidate solutions, wherein the plurality of nodes that are likely to be part of the solution to the tree graph are identified from the list of candidate solutions.

In some embodiments according to the first aspect, processing the plurality of sub-trees in parallel further comprises: determining a local solution to one of the plurality of sub-trees; communicating the local solution to one or more of the processing elements continuing to process other ones of the plurality of sub-trees; and performing tree pruning for said other ones of the plurality of sub-trees, based on the local solution to said one of the plurality of sub-trees.

In some embodiments according to the first aspect, allocating one or more of the processing elements comprises: for each sub-tree, determining a number of nodes in the sub-tree that are shared by other ones of the sub-trees; and allocating the processing elements to the sub-trees by allocating more processing elements to a sub-tree with fewer shared nodes to a sub-tree with more shared nodes.

In some embodiments according to the first aspect, allocating one or more of the processing elements comprises: determining an initial allocation of the processing elements among the sub-trees; starting to process the plurality of sub-trees using the initially allocated processing elements; and whilst processing the plurality of sub-trees, dynamically re-allocating processing elements from one of the plurality of sub-trees to another one of the plurality of sub-trees.

In some embodiments according to the first aspect, information defining the sub-trees is determined in advance and stored for each one of a plurality of interference matrices, and the method further comprises: determining a current interference matrix for a received signal; and retrieving the stored information defining the sub-trees associated with one of the plurality of interference matrices which corresponds to the current interference matrix for the received signal.

In some embodiments according to the first aspect, the tree graph is partitioned into the sub-trees by identifying one or more leaf nodes for which a value of the metric of promise is less than a threshold, wherein the tree graph can be partitioned into the sub-trees by including all identified leaf nodes in the sub-trees, and excluding other leaf nodes from the sub-trees. In such embodiments, the method may further comprise: identifying a number C of leaf nodes, where C is equal to the number of processing elements, by identifying the C most likely leaf nodes to contain the solution to the sphere decoding tree, based on the metrics of promise, wherein the tree graph is partitioned into C sub-trees, each of the C sub-trees containing one of the identified C leaf nodes.

In some embodiments according to the first aspect, each sub-tree may be processed using K-Best sphere decoding, and prior to processing the sub-trees the method can further comprise: separately selecting a value of the K-parameter for each level of the tree graph, by selecting the minimum value required to include all visited nodes at that level for all of the identified one or more leaf nodes.

In some embodiments according to the first aspect, the method can be used for sphere decoding in a multicarrier system, and can further comprise: performing sphere decoding for a first one of a plurality of subcarriers by performing the steps of partitioning a sphere decoding tree into a plurality of sub-trees, and processing the sub-trees in parallel by allocating one or more of the processing elements to each of the sub-trees; and sequentially repeating the steps of partitioning the sphere decoding tree into a plurality of sub-trees and processing the sub-trees in parallel by allocating one or more of the processing elements to each of the sub-trees, for each remaining one of the plurality of subcarriers, until sphere decoding has been performed for each of the plurality of subcarriers.

In some embodiments according to the first aspect, the sub-trees are processed using a sub-optimal sphere decoding algorithm, and each of the sub-trees includes a single leaf node from the sphere decoding tree.

In some embodiments according to the first aspect, two or more of the processing elements may be allocated to one of the sub-trees, and said one of the sub-trees can be processed by partitioning the sub-tree into two or more second sub-trees, and allocating one of the processing elements to each of the two or more second sub-trees.

According to a second aspect of the invention, there is provided a non-transitory computer-readable storage medium on which is stored computer program instructions for finding a vector solution to a tree search problem using a plurality of processing elements, wherein when executed, the computer program instructions are configured to perform the steps of: obtaining a tree graph; identifying a plurality of nodes in the tree graph that are likely to be part of the solution to the tree graph; partitioning the tree graph into a plurality of sub-trees, each sub-tree including one or more of the identified nodes; processing the plurality of sub-trees in parallel by allocating one or more of the processing elements to each of the sub-trees; and determining the solution based on results of the sub-tree processing.

According to a third aspect of the invention, there is provided apparatus for finding a vector solution to a tree search problem, the apparatus comprising: a plurality of processing elements; means for obtaining a tree graph; means for identifying a plurality of nodes in the tree graph that are likely to be part of the solution to the tree graph; means for partitioning tree graph into a plurality of sub-trees, each sub-tree including one or more of the identified nodes; means for controlling the plurality of processing elements to process the plurality of sub-trees in parallel by allocating one or more of the processing elements to each of the sub-trees, and to determine the solution based on results of the sub-tree processing.

BRIEF DESCRIPTION OF THE DRAWINGS

Embodiments of the present invention will now be described, by way of example only, with reference to the accompanying drawings, in which.

DETAILED DESCRIPTION

In embodiments of the present invention, a plurality of processing elements can be used in parallel to find one or more vector solutions to a tree search problem. The one or more vectors may be any solution of interest, for example an exact or approximate solution, and may be an extremum (maximum or a minimum) or approximation. Embodiments of the invention are disclosed herein in which the tree search problem is a sphere decoding problem, however, embodiments of the present invention are not limited to use in sphere decoders. In other embodiments, for example, a similar approach may be used in a sphere encoder or max-log maximum a posteriori (MAP) soft decoders. Also, it should be appreciated that although embodiments of the invention are described in relation to searching for one or more vectors of transmitted symbols, the principles disclosed herein can readily be applied to any kind of search spaces. For example, in some embodiments soft sphere decoding may be performed (soft output, soft-input soft output).

An embodiment of the invention will now be described in which a sphere decoding tree is partitioned into sub-trees which can then be processed in parallel by a plurality of processing elements. The processing elements may take various forms in embodiments of the present invention. For example, in a multiprocessor system-on-a-chip (MPSoC)

embodiment each processing element may be a separate processor on the chip, in a field programmable gate array (FPGA) embodiment each processing element may be a specifically allocated part of the FPGA chip, and in a cloud processing embodiment each processing element may be an individual processing element in a grid computing system.

Figure 2:
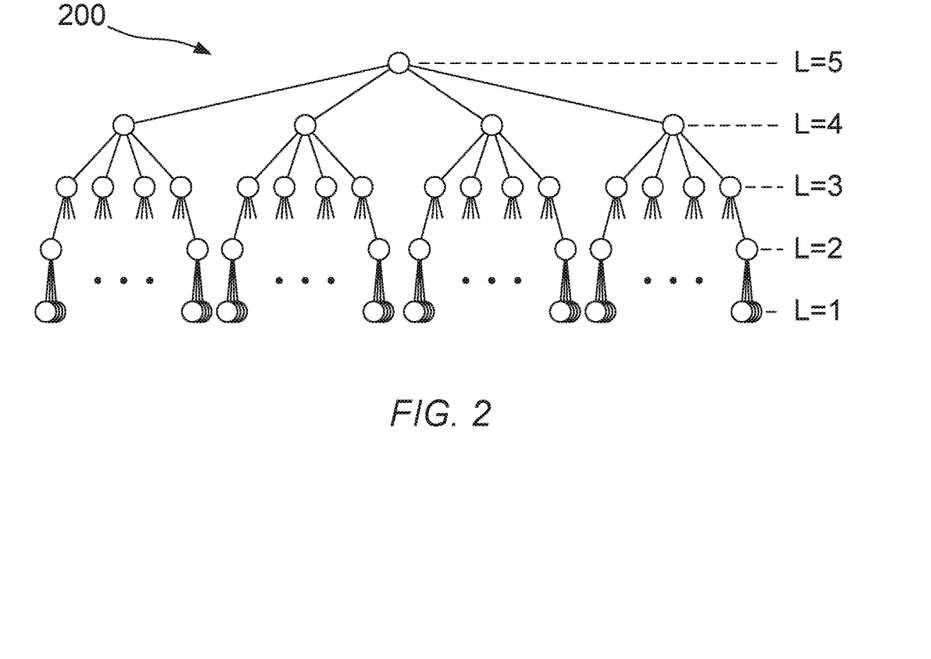
FIG. 2 illustrates an example of a sphere decoding tree.
Figure 3:
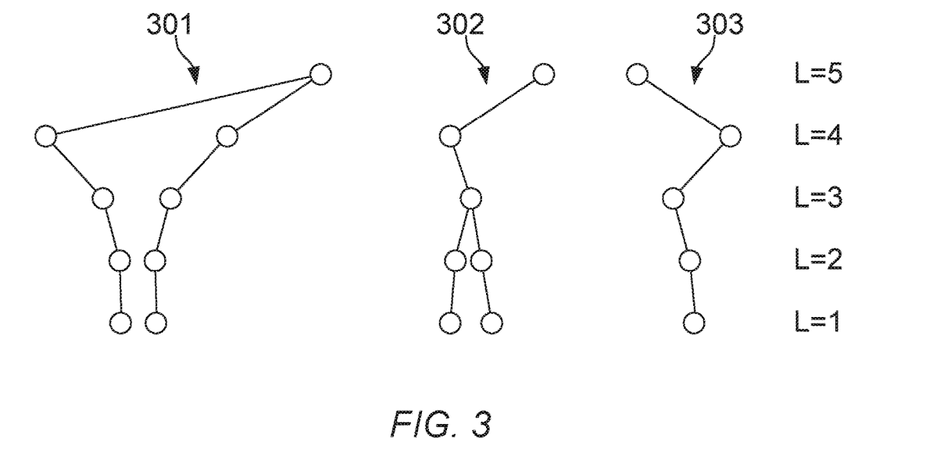
FIG. 3 illustrates a plurality of sphere decoding sub-trees obtained by partitioning the sphere decoding tree of FIG. 2, according to an embodiment of the present invention.

A sphere decoding method according to an embodiment of the present invention will now be described with reference to the flowchart shown in FIG. 1. An example of a sphere decoding tree is illustrated in FIG. 2, and sub-trees obtained by partitioning the sphere decoding tree of FIG. 2 using the method of FIG. 1 are illustrated in FIG. 3.

Figure 1:
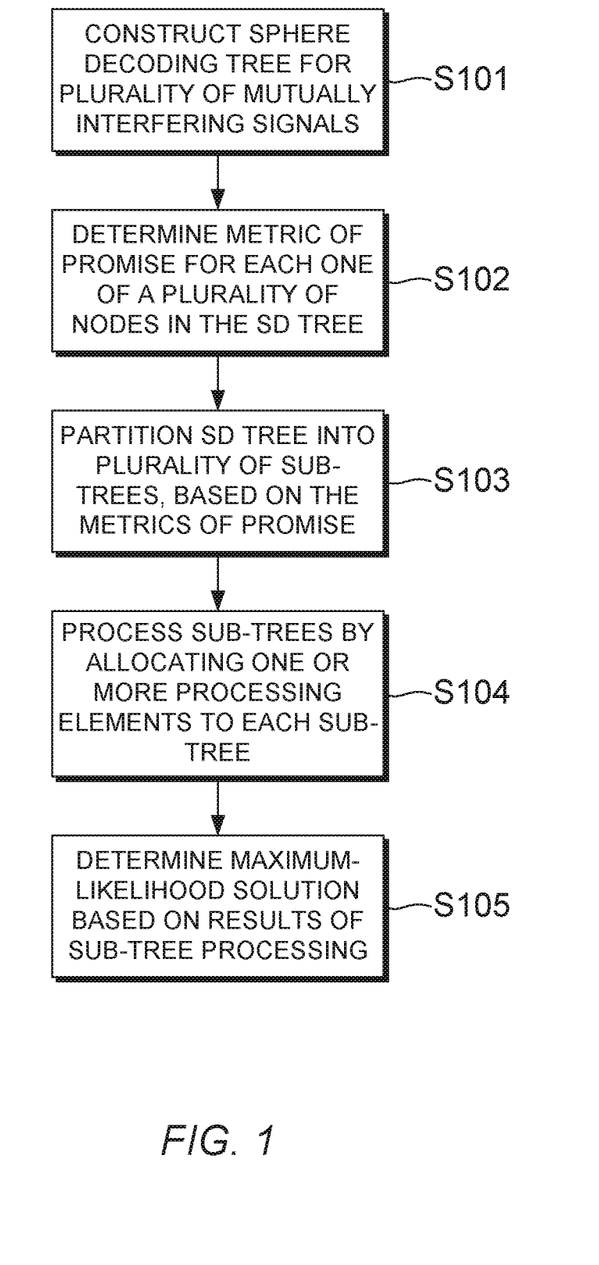
FIG. 1 is a flowchart illustrating a sphere decoding method, according to an embodiment of the present invention.

A sphere decoding method according to an embodiment of the present invention is illustrated by the flowchart shown in FIG. 1. The method may be used to demultiplex a plurality of mutually interfering signals received by a single equipment or by several equipments (e.g. in the case of distributed MIMO) in any wireless communication network, for example user equipment (UE) or a wireless access point in a wireless telecommunications network. The received signal, y, can be represented as:

$$y = Hs + n$$

where s is the symbol vector of size N including each of the interfering data symbols selected from a constellation S, H is an interference matrix describing the effect of the mutually interfering signals, and n is a noise vector. For example, in the case of multiple-input, multiple-output (MIMO) wireless systems with spatial multiplexing, y can be the received signal after analogue-to-digital conversion, and H can be the MIMO channel matrix.

In general, sphere decoding can be used to solve problems of the form:

$$\hat{s} = \underset{s \in S^N}{\operatorname{argmin}} \|y - Hs\|^2$$

In the present embodiment, sphere decoding is performed by constructing a sphere decoding tree in step S101 based on the interference matrix H. Methods of transforming the detection problem into a tree search problem are known in the art of sphere decoding, and a detailed description will not be provided here so as to avoid obscuring the present inventive concept. However, in brief, the sphere decoding tree can be constructed by any method that decomposes the interference matrix H into an upper triangular matrix R with elements $R_{ij}$, such that H=QR.

The detection problem then becomes a tree search problem of finding the estimated symbol vector, ŝ, given by minimizing the Euclidean distance:

$$\hat{s} = \underset{s \in S^N}{\operatorname{argmin}} \|y' - Rs\|^2$$

with $y' = Q^H y$

The tree search problem can be understood from a diagram such as the one shown in FIG. 2. The sphere decoding tree 200 comprises a plurality of nodes arranged in levels from l=(N+1) down to l=1. The node at level (N+1) is hereinafter referred to as the root node, and each node at level 1 is hereinafter referred to as a leaf node. Each node in the tree represents a possible transmitted data symbol. A node at level l is connected to a total of B nodes at level l−1, where B is the size of the alphabet from which the data symbols are selected. The number of levels is equal to the size of the transmitted vector. The sphere decoding tree therefore includes a total of $B^N$ leaf nodes. In the present example B and N are both equal to 4, but embodiments of the invention can be applied to systems with any values of B and N. The path from a leaf node back to the root node corresponds to one possible transmitted vector. One of the leaf nodes will therefore correspond to the actual symbol vector, s. By identifying this leaf node with the minimum Euclidean distance the data symbols for the interfering signals can be determined in the maximum-likelihood sense.

The sphere decoder determines the estimated symbol vector, ŝ, by performing a tree search to find the leaf node with the smallest partial Euclidean distance (PD) as defined by Eq 1 (below). The recursion starts at the root node at level l=(N+1), and the corresponding PD for any node (symbol) at any level l are a function of all the nodes at higher levels belonging to the same path. In the present embodiment, the PD for each node may be calculated as:

$$D(s_l) = D(s_{l+1}) + \Delta(s_l) \qquad \text{(Eq. 1)}$$

$$\text{where } \Delta(s_l) = \left\| y'_l - \sum_{j=l}^{N} R_{jl} s_j \right\|^2$$

with $s_l = [s_l, s_{l+1}, \ldots, s_N]^T$ being the partial symbol vectors on this tree path and $D(s_{N+1}) = 0$. Then the ML solution corresponds to finding the ML with the smallest PD at level l=1.

The process of performing a tree search to find the estimated symbol vector is referred to as sphere decoding. Embodiments of the invention may be applied to any kind of sphere decoder and tree search problem for which metrics can be described or approximated by equations similar to that shown in Eq. 1.

After constructing the sphere decoding tree, in step S102 a metric of promise (MoP) is determined for each one of a plurality of nodes in the sphere decoding tree. The MoP for each node is related to the likelihood that the node is part of the ML solution. To put it another way, the MoP for each node is related to the likelihood that the node is part of the path from the root (node at l=N+1) to the leaf (node at l=1) with the minimum PD. In step S102, the MoPs can be used to identify a plurality of nodes in the tree graph that are likely to be part of the solution to the tree graph.

The MoP can take different forms, depending on the embodiment. For example, the MoP may be the exact probability that the node is part of a solution to the sphere decoding problem, which may be the correct solution, the maximum-likelihood solution, or in general some erroneous version of the correct solution, or the MoP may be an approximation or (upper) bound of the probability, or any metric related to the corresponding likelihood. Alternatively, the MoP may be an ad-hoc metric of probabilistic reasoning, for example based on the observation that a node with a smaller PD is more likely to appear in the ML solution than a node with a higher PD. Furthermore, in some embodiments the MoP may be a function of PDs calculated during a prior sphere decoding process. In addition, the MoP may account for the exact interference matrix H, approximations or functions of H, like decompositions of H, or its statistics (e.g., mean, variance) or their approximations, if such a matrix has several realizations. MoPs may account for the noise statistics, functions or approximations.

In some embodiments, the MoPs are calculated and stored in advance before the detection process starts. For example, in embodiments in which the MoPs are determined based on the statistics of the interference matrix, the MoPs can be calculated in advance without knowing the exact values of each element $R_{ij}$, which may only be available later once full channel state information (CSI) has been obtained.

Furthermore, although in the present embodiment the nodes that are most likely to be part of the solution to the sphere decoding tree are identified based on MoPs, in other embodiments a different method of identifying the most promising nodes may be used. For example, in some embodiments a vector search method such as a list sphere decoder may be used to obtain a list of candidate solutions, without needing to calculate a specific MoP for each node in the sphere decoding tree. Each of the candidate solutions includes a plurality of nodes that are likely to be a part of the solution to the sphere decoding tree.

Next, in step S103 the sphere decoding tree is partitioned into sub-trees, each sub-tree including one or more of the nodes identified in step S102 as being a promising candidate for a solution to the sphere decoding tree. As described above, in the present embodiment the most promising nodes are identified based on the determined MoPs. Depending on the embodiment, the tree partitioning step S103 may include all nodes of the initial tree search, or may only include a subset of nodes resulting in approximate sphere decoding. In some embodiments, when nodes are excluded in the tree partitioning step S103, it may not be necessary to calculate MoPs for the nodes to be excluded, although in some embodiments nodes may be excluded after calculating MoPs for all nodes in the full SD tree.

Since each sub-tree includes a promising candidate for the wanted solution, the sub-trees are nearly-independent and each sub-tree can be processed without having to wait for results from other sub-trees. The method of the present embodiment therefore enables nearly-embarrassingly parallel processing of the SD tree. In comparison, prior art approaches to parallelizing the sphere decoder do not produce independent processing threads, and hence require strong interaction between the parallel processors.

In some embodiments, the sub-trees can be processed in two phases. In the first processing phase, the sub-trees are processed independently to identify one or more local candidate solutions from each sub-tree, and the candidate solutions are shared between the processing elements. Then, in the second processing phase, a previously unsearched (non-promising) part of each sub-tree can be searched for the actual solution, taking into account the identified candidate solutions from the other subtrees.

Examples of three possible sub-trees 301, 302, 303 than can be obtained from the SD tree 200 of FIG. 2 are illustrated in FIG. 3. The sub-trees shown in FIG. 3 include a first sub-tree 301 (left-hand diagram), second sub-tree 302 (central diagram), and third sub-tree 303 (right-hand diagram). The sub-trees 301, 302, 303 illustrated in FIG. 3 are shown for example purposes only, and the sub-trees may take different forms depending on the actual interference matrix H and the partition strategy, which may change according to the goal to be achieved by parallelization. For example, the way in which the SD tree 200 is partitioned into sub-trees may differ according to the intended goal (e.g. latency reduction or power reduction), the tree traversal algorithm to be used, and whether information exchange is permitted between processing elements operating on different sub-trees in parallel. Furthermore, although three sub-trees 301, 302, 303 are illustrated in FIG. 3, in general a sphere decoding tree may be partitioned into any number of sub-trees.

Depending on the embodiment, each sub-tree may comprise a plurality of nodes at one or more levels, as is the case for the first and second sub-trees 301, 302 in FIG. 3, or may comprise a single node at each level, as is the case for the third sub-tree 303 in FIG. 3. In other words, each sub-tree may include a single leaf node from the full sphere decoding tree 200, or may include a plurality of leaf nodes. Some nodes may be included in more than one sub-tree. Furthermore, in some embodiments a sub-tree may not include the root or nodes at higher levels.

In embodiments of the invention, a sphere decoding tree 200 may be partitioned by examining the determined MoPs per tree level or across many levels. The method used to partition the sphere decoding tree may depend on the target of the SD parallelization, for example whether latency reduction or power reduction is the primary consideration. The partitioning method may also depend on the tree-traversal algorithm to be used when performing sphere decoding on each sub-tree, and/or on whether any information exchange is permitted between processing elements allocated to different sub-trees. For example, knowledge of the minimum PD found across all the partitions of the SD tree can enable more efficient tree pruning, and in some embodiments the processing element(s) allocated to a sub-tree may be configured to communicate the minimum PD of the sub-tree to other processing element(s) allocated to different sub-trees.

The step of partitioning the sphere decoding tree 200 into sub-trees may be performed during a sphere decoding operation, or may be performed in advance ('offline'). When the sphere decoding tree 200 is partitioned offline, information defining the sub-trees can be determined and stored in advance. Since partitioning the tree graph into sub-trees is a computationally intensive process, calculating the sub-trees offline provides a performance benefit by enabling the sphere decoding operation to be completed more quickly during normal operation. In applications where the interference matrix for a received signal can change over time, a plurality of tree graphs can be obtained and partitioned in advance for a plurality of possible values of the interference matrix. Then, when a signal is received and sphere decoding is to be performed, the current interference matrix can be identified and the stored information defining sub-trees can be retrieved for the current interference matrix. This avoids having to construct the tree graph, calculate MoPs and determine the sub-trees every time sphere decoding is performed.

After partitioning the sphere decoding tree 200 into sub-trees, in step S104 the sub-trees are processed by allocating one or more of the processing elements to each of the sub-trees, and processing the sub-trees in parallel using the allocated processing elements. Each processing element or set of processing elements allocated to a sub-tree is therefore responsible for searching a sub-space of the overall tree search, and finding the corresponding leaf node with the minimum PD within the sub-tree.

To find the leaf node with the minimum PD within a sub-tree, the processing element(s) allocated to the sub-tree may use various tree-traversal algorithms. Tree-traversal algorithms can generally be characterised as depth-first or breadth-first, although other variations are possible which do not fall into either category, such as Monte Carlo tree traversal algorithms. Furthermore, in some embodiments the processing elements may be configured to exchange information between one another while performing sphere decoding. For example, the processing elements allocated to different sub-trees may exchange information about the minimum PD found so far within their own sub-trees, to enable more aggressive pruning of other sub-trees while sphere decoding is still ongoing.

Depth-first algorithms can guarantee the ML solution, and are very efficient since aggressive pruning can be performed based on the PD of already visited leaf nodes within the sub-tree. However, their processing latency and complexity is not fixed but depends on the interference matrix, the signal-to-noise ratio (SNR) and the number of multiplexed streams, and can be prohibitive for practical, high-dimensional systems (e.g. large MIMO).

Breadth-first algorithms typically visit a predetermined number of nodes per tree level. They exhibit reduced latency requirements, however, to provide performance close to the ML solution, the search space (the number of visited nodes) has to be large enough to account for the "worst-case" operation scenario. As a result, typical breadth-first algorithms exhibit substantially higher complexity than depth-first algorithms, and their complexity and power consumption can become prohibitive for very dense symbol constellations and a large number of mutually interfering streams.

In some embodiments all processing elements may use the same tree-traversal algorithm. However, in other embodiments different tree-traversal algorithms may be used for different ones of the sub-trees, and the most efficient tree-traversal algorithm may be selected for each sub-tree in consideration of the geometry of the particular sub-tree.

In some embodiments the processing elements may be allocated in a dynamic manner, whereby a processing element originally allocated to one sub-tree can be re-allocated to another sub-tree during the detection of the symbol vectors. For example, idle processing elements that have finished processing a sub-tree may subsequently be re-allocated to other sub-trees that are still being processed. In some embodiments, one or more processing elements may be re-allocated from a first sub-tree to a second sub-tree before processing of the first sub-tree has completed, if it becomes apparent during processing that the desired solution (e.g. exact solution or ML solution) is unlikely to be contained in the first sub-tree, and that the second sub-tree is a more promising candidate. However, in other embodiments the processing elements may be allocated in a static manner, whereby no re-allocation of processing elements is performed during the detection of the symbol vectors.

Continuing with reference to FIG. 1, after the sub-trees have been processed, then in step S105 the ML solution for the full sphere decoding tree is determined based on results of the sub-tree processing. For example, in step S105 the leaf node with the smallest PD among all of the sub-trees may be identified as the ML solution for the full sphere decoding tree. In some embodiments, information about the smallest PD currently found may be shared between processing elements before processing has completed, to enable pruning of the sub-trees.

Embodiments of the invention will now be described with reference to specific examples. For all examples, sphere decoding in the context of MIMO detection is assumed with spatial-multiplexing for an 8×8 MIMO system with 16-QAM (quadrature amplitude modulation), in a multi-carrier system with 64 subcarriers. Each sub-channel between a transmit/receive antenna pair is modelled as a 5 tap independent and identically distributed (iid) Rayleigh channel (in the time domain), and additive white Gaussian noise is assumed. These parameters are used by way of example only, and embodiments of the invention can also be applied to sphere decoding in other types of system in which different parameters and modulation techniques are used.

Example 1

In this embodiment sphere decoding is performed by using a depth-first tree traversal algorithm to process each sub-tree. The exact ML solution is targeted, namely, the leaf node with minimum PD across the whole SD tree. A MoP that is an approximate bound of the average actual PD is calculated for each node in the full sphere decoding tree. In the present embodiment, the sphere decoding tree is partitioned into sub-trees on the basis that nodes with smaller PDs are more likely to be included in the ML solution.

In the present embodiment, a Eucleadean distance for level l and corresponding symbol (node) $s_l$ is defined as:

$$d^2(s_l) = \|s_{l,0} - s_l\|^2$$

where $s_{l,0}$ are the symbols that minimise the distance:

$$\Delta(s_l) = \left\| y'_l - \sum_{j=1}^{N} R_{jl} s_j \right\|^2$$

For a symmetric constellation such as QAM, a MoP can be defined as:

$$M(s_l) = M(s_{l+1}) + \Delta_M(s_l) \qquad \text{(Eq. 2)}$$

$$\text{with } \Delta_M(s_l) = \begin{cases} |W_{ll}|^2 d^2(s_l); & s_l \neq s_{l,0} \\ 0; & s_l = s_{l,0} \end{cases}$$

$$\text{and } \Delta_M(s_{N+1}) = 0$$

In the present embodiment, the term $W_{ll}$ is defined based on the statistics of the upper triangular matrix R obtained by decomposing the interference matrix H, as:

$$W_{ll} = \sqrt{N-l+1}$$

In the present embodiment, the MoP is defined based on the statistics of the interference matrix, and $d^2(s_l)$ is only a function of the distance between constellation symbols, which is fixed and therefore known a priori. Therefore the values of the MoPs for each node, and hence the way in which the sphere decoding tree is partitioned, is not dependent on the actual values of $R_{ij}$. Accordingly, in the present embodiment the MoPs and sub-trees can be determined in advance, since they are just a function of the interference matrix statistics and the constellation geometry. For example, the sub-trees can be obtained in advance by using a non-parallel list sphere decoder to find a certain number of leaf nodes with smaller metrics $M(s_l)$. Since the step of partitioning the full sphere decoding tree into sub-trees can take place offline, it does not affect the complexity of the approach. In response to the interference matrix changing, for example if the number of users in the system changes, the partitioning scheme can be adapted accordingly. It is noted that in this embodiment of the parallel sphere decoder, the nodes are mapped to nodes depending on their relative distance to $s_{l,0}$, therefore, in order to decide the actual nodes included in each sub-tree, $s_{l,0}$, should be calculated first.

Alternative definitions of the MoP and $W_{ll}$ are possible. In another embodiment, $W_{ll}$ can be set to be equal to $R_{ll}$ in order to perform partitioning based on the exact interference matrix.

Figure 4:
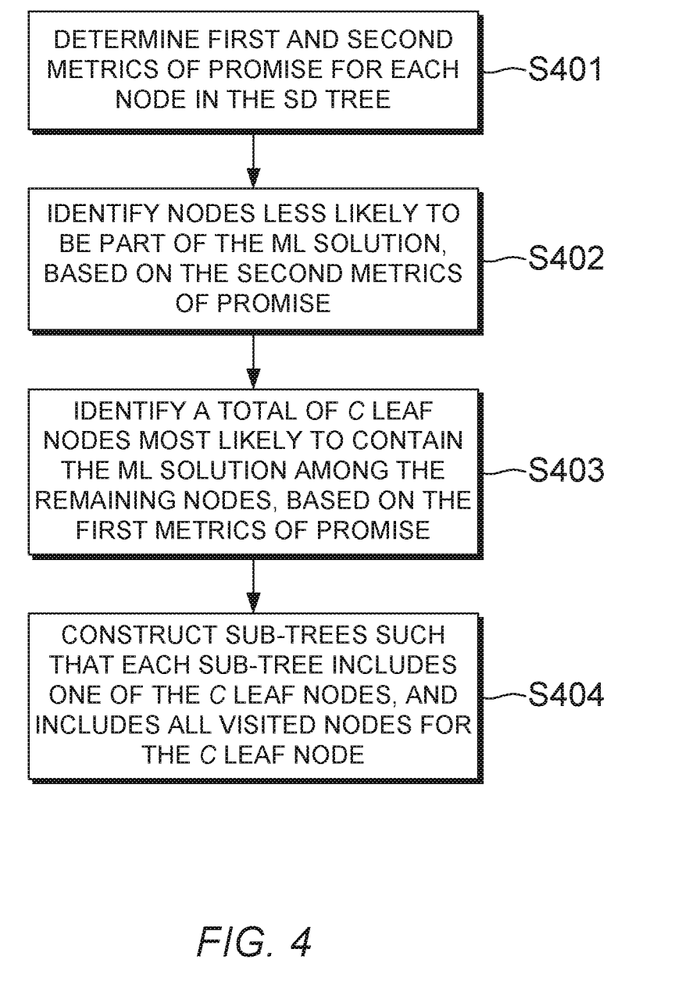
FIG. 4 is a flowchart illustrating a method of partitioning a sphere decoding tree into sub-trees, according to an embodiment of the present invention.

A partitioning method used in the present embodiment is illustrated in FIG. 4. In this embodiment, two MoPs are calculated for each node in the full sphere decoding tree in step S401. The first MoP for each node is as calculated as defined above in Eq. 2. In the present embodiment, a second MoP, $M_2(k)$, for a node k related to the constellation symbol s(k) at level l in the sphere decoding tree is calculated as:

$$M_2(k) = \frac{\exp\{-|(s_{l,0} - s_k)W_{ll}|^2/2\sigma_n^2\}}{\sum_k \exp\{-|(s_{l,0} - s_k)W_{ll}|^2/2\sigma_n^2\}} \quad \text{(Eq. 3)}$$

In the present embodiment the definition of the second MoP assumes additive white Gaussian noise, and is based on the observation that the probability density function of the chi-squared distribution for two degrees of freedom is an exponential function. Therefore the second MoP includes information about the noise statistics. However, in other embodiments a different definition may be used for the second MoP.

Next, in step S402 the values of the second MoP calculated using Eq. 3 are used to identify one or more nodes in the full sphere decoding tree which are less likely to be part of the ML solution. In the present embodiment, a node is identified as being less likely to be part of the ML solution in step S402 if the value of $M_2(k)$ for that node is smaller than a predefined threshold value, $T_H$.

Then, in step S403, any nodes identified in step S402 are excluded when searching for leaf nodes in the full sphere decoding tree which are most likely to contain the ML solution, using the first MoPs calculated according to Eq. 2. In the present embodiment, a predefined number C of leaf nodes are searched for in step S403, where C is equal to the number of available processing elements. That is, the search in step S403 returns the C leaf nodes which are most likely to contain the ML solution, as indicated by the first MoPs. These C leaf nodes are hereinafter referred to as 'plants'.

By using a second MoP to exclude nodes that are unlikely to be part of the ML solution from the search carried out in step S403, the present embodiment can reduce the total complexity of the sphere decoding scheme.

In some embodiments, the plants can be calculated without a specific mathematical definition of the MoPs, but indirectly using a vector search method, for example by performing one or more list or traditional single element tree searches to obtain a list of candidate solutions. Each of the candidate solutions includes a plurality of nodes that are likely to be a part of the solution to the sphere decoding tree. The plants, each of which contains a leaf node that is likely to be part of the solution, can then be constructed from the list of candidate solutions. In this way, the sphere decoding tree can be partitioned into sub-trees without calculating MoPs.

Then, in step S404 a plurality of sub-trees are constructed from the full sphere decoding tree, such that all visited nodes for the C leaf nodes identified in step S403 are included in the sub-trees. Each sub-tree is constructed around one of the plants, that is, one of the C leaf nodes identified in step S403, by adding other leaf nodes to the plant that were not among the C most promising leaf nodes identified in step S403. In this way, each sub-tree constructed in step S404 includes one of the C most promising leaf nodes, and one or more other less promising leaf nodes from the full SD tree. Since all visited nodes are included in the sub-trees, no performance degradation is experienced compared with a conventional non-parallel sphere decoding method.

In the present embodiment, once a processing element finds the first candidate solution for its sub-tree (the solution with minimum PD for the sub-tree), this candidate solution is communicated to the other processing elements to enable efficient sub-tree pruning, by terminating a branch as soon as the PD exceeds the known minimum PD from another sub-tree.

Additionally, in some embodiments a redundancy factor can be calculated for each of the plants, on the basis that some nodes will be included in multiple plants and therefore result in redundant calculations being performed when the plants are processed. In some embodiments, the redundancy factors can be used to exclude one or more plants that are least likely to contain the ML solution, to satisfy redundancy requirements and reduce the overall complexity.

After obtaining the sub-trees in step S404, the sub-trees are then processed as described above in step S104 of FIG. 1, by allocating one processing element to each sub-tree. In this way, each of the C available processing elements will process one of the C most promising leaf nodes. The final ML estimate can be obtained by finding the leaf node with the minimum PD across the parallel-processed sub-trees.

In the present embodiment, specific MoPs based on the average channel are used, as defined in Eq. 2 and Eq. 3. However, embodiments of the invention are not limited to these MoPs. For example, in other embodiments different MoPs may be used which are approximate versions based on a specific channel realization.

Furthermore, in certain scenarios it may be necessary to run multiple sphere decoders applied on the same interference matrix. In such cases, embodiments of the present invention can be configured to run a non-parallel list sphere decoder for some of sphere decoders, and then identify the sub-trees by finding leaf nodes that appear more times in the several lists.

Simulation results for a conventional non-parallel sphere decoder, a parallel sphere decoder without probabilistic MoPs, and an MoP-based parallel sphere decoder according to the present embodiment are illustrated in FIGS. 5 to 10. The simulation results assume that each sub-tree is mapped onto one processing element, which is responsible for performing the corresponding tree search for that sub-tree using sphere decoding, visiting one tree node per processing clock cycle. This assumption permits the overall latency to be evaluated in terms of clock cycles with the actual clock frequency depending on the specific sphere decoder implementation. In addition, it is assumed that after a processing element finds the first candidate solution for its sub-tree, which is the leaf node with the minimum PD for that sub-tree, this PD is communicated to all other sub-tree sphere decoders.

Figure 5:
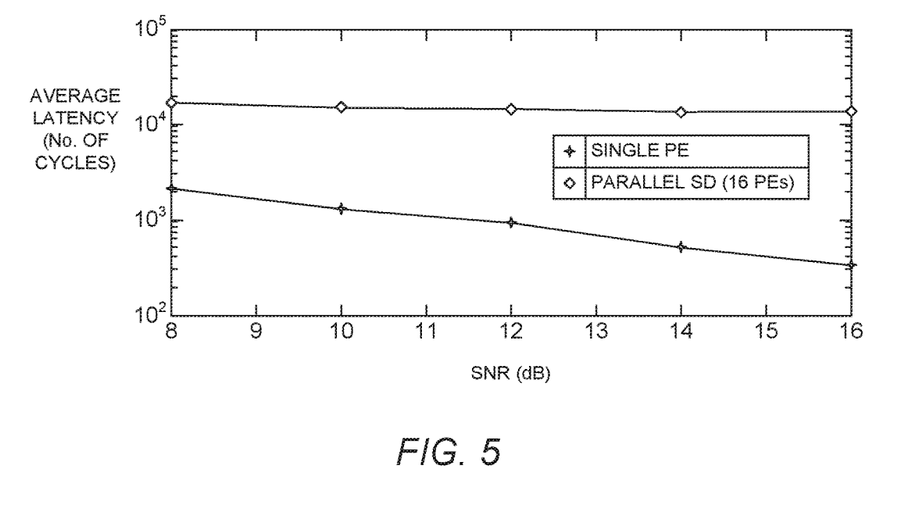
FIG. 5 is a graph comparing the latency of a conventional non-parallel sphere decoder to a hypothetical parallel sphere decoder which does not employ MoPs.
Figure 6:
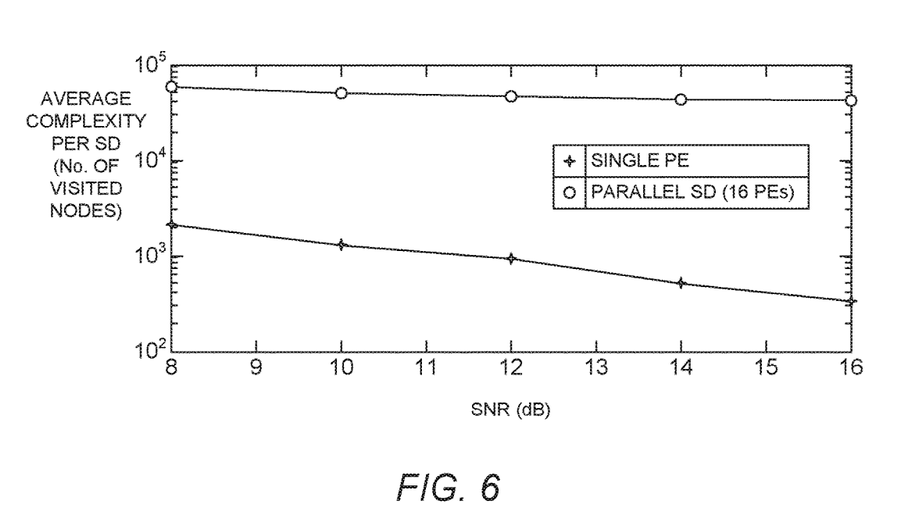
FIG. 6 is a graph comparing the complexity of a conventional non-parallel sphere decoder to a hypothetical parallel sphere decoder which does not employ MoPs.

FIGS. 5 and 6 illustrate the sphere decoding processing latency, in cycles, and the complexity, in visited nodes, as a function of the signal-to-noise ratio (SNR) for a conventional non-parallel sphere decoder (single processing element, PE) and a parallel sphere decoder which does not employ MoPs. Since one node-per-cycle architecture is assumed, the complexity of the conventional single-PE sphere decoder, in terms of visited nodes, is equal to the latency in cycles.

The parallel sphere decoder used as an example in FIGS. 5 and 6 employees 16 processing elements and partitions the original sphere decoding tree in 16 similar sub-trees, with each consisting of four randomly selected nodes (e.g. four QAM symbols out of 16) at the two higher levels of the tree. As shown in FIGS. 5 and 6, such a simplistic parallelization approach without taking into account MoPs actually increases rather than decreasing the latency and complexity, since parallelization prevents efficient tree pruning from being performed.

Figure 7:
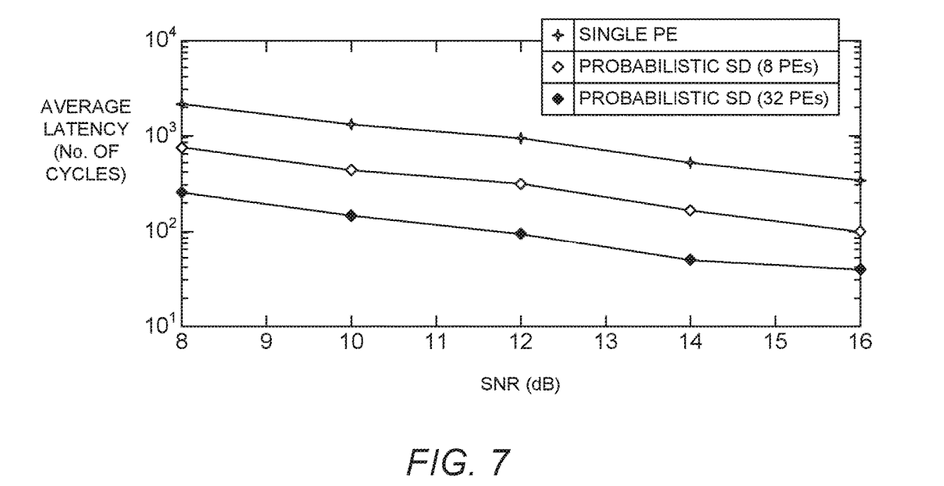
FIG. 7 is a graph comparing the latency of a conventional non-parallel sphere decoder to two parallel sphere decoders according to embodiments of the present invention.
Figure 8:
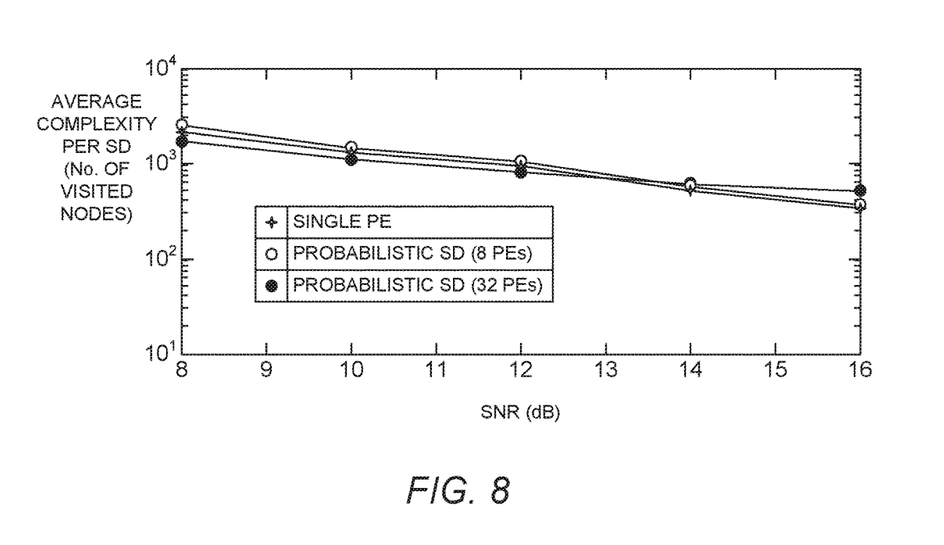
FIG. 8 is a graph comparing the complexity of a conventional non-parallel sphere decoder to two parallel sphere decoders according to embodiments of the present invention.

In contrast to the simplistic parallel sphere decoder illustrated in FIGS. 5 and 6, results for MoP-based parallel sphere decoders according to embodiments of the present invention are shown in FIGS. 7 and 8. An MoP-based parallel sphere decoder may also be referred to as a 'probabilistic' sphere decoder, since the parallelization is performed by taking into account the likelihood of a given node appearing in the ML solution. Here, the term 'probabilistic' does not necessarily mean that the MoPs are based on an exact mathematical probability. For example, in some embodiments, a probabilistic sphere decoder may employ any MoPs that are related to the likelihood of a given node appearing in the desired solution to the tree search problem. As shown in FIG. 7, the probabilistic sphere decoder provides reduced latency in comparison to a conventional non-parallel sphere decoder, and the latency decreases further as more processing elements are added. Also, as shown in FIG. 8, the complexity of the probabilistic sphere decoder is comparable to that of a conventional highly optimized non-parallel sphere decoder, in contrast to a simple parallelization scheme which results in much higher complexity, as shown in FIG. 6. In the example shown in FIG. 8, MoP calculation and partitioning of the sphere decoding tree takes place offline (i.e. does not consider the specific channel realization), and accordingly the partition complexity does not affect the overall parallel sphere decoding complexity. As shown in FIGS. 7 and 8, the processing latency scales efficiently with the number of processing elements, and for 32 processing elements a latency reduction of almost an order of magnitude can be achieved with insignificant complexity increase.

Figure 9:
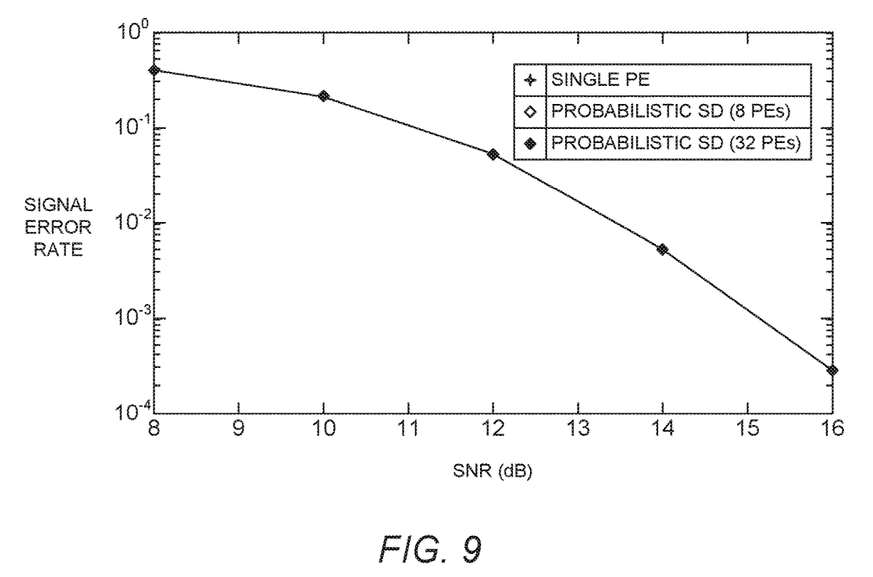
FIG. 9 is a graph plotting the symbol error rate (SER) as a function of SNR for a conventional non-parallel sphere decoder and for two parallel sphere decoders, according to embodiments of the present invention.

FIG. 9 is a graph plotting the symbol error rate (SER) as a function of SNR for a conventional non-parallel sphere decoder and for two probabilistic sphere decoders, according to embodiments of the present invention. As shown in FIG. 9, the SER of the probabilistic sphere decoders is identical to that of the non-parallel sphere decoder, indicating that no accuracy is lost by partitioning the sphere decoding tree into sub-trees.

In some embodiments of the invention, probabilistic sphere-decoding methods can be applied to multi-carrier schemes with MIMO spatial multiplexing, in which there is one MIMO system per subcarrier. In this case, it is necessary to perform sphere decoding separately for each subcarrier. In such a scenario, one hypothetical parallelization scheme could involve allocating one processing element to each subcarrier and processing the subcarriers in parallel. In effect, this would result in N single-PE systems running in parallel for N subcarriers. In this case, the processing latency required to find the ML solution would be determined by the slowest one of the N single-PE systems.

However, investigations by the inventors have shown that a further performance improvement can be obtained by processing the subcarriers sequentially rather than in parallel, and applying probabilistic parallel sphere decoding to each subcarrier. Parallel sphere decoding can be performed separately for each sub-carrier by using a probabilistic sphere decoding scheme and a plurality of processing elements, such as the one described above. Once sphere decoding has been completed for the first subcarrier, the processing elements can then be used to perform probabilistic parallel sphere decoding for the second subcarrier, and so on, until all subcarriers have been processed.

Figure 10:
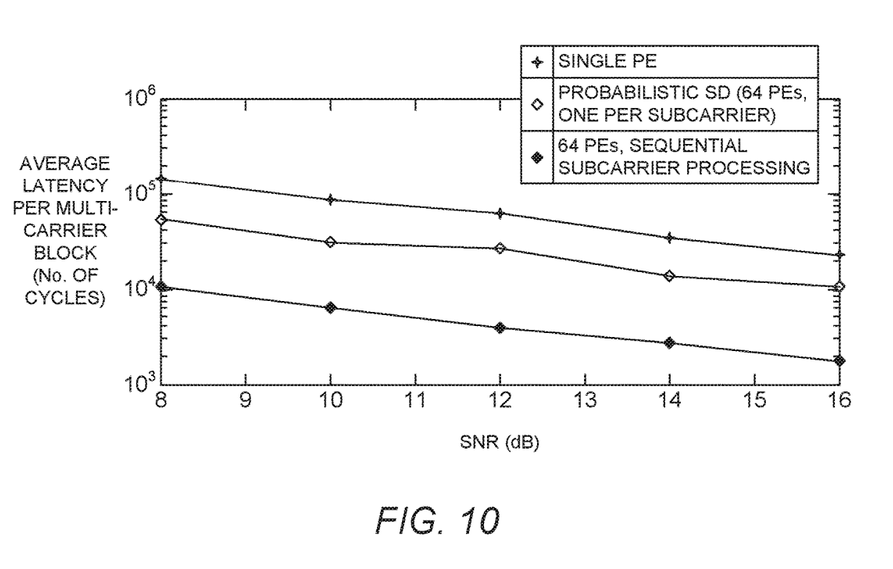
FIG. 10 is a graph plotting the average latency as a function of SNR for a conventional non-parallel sphere decoder (single PE), a parallel sphere decoder with 64 PEs in which one PE is allocated to each subcarrier, and a parallel sphere decoder with 64 PEs configured to sequentially perform parallel sphere decoding for each subcarrier, according to an embodiment of the present invention.

The relative performance of different sphere decoding schemes in a multi-carrier MIMO system is shown in FIG. 10, which illustrates a graph plotting the average latency as a function of SNR for a conventional non-parallel sphere decoder (single PE), a system with 64 PEs in which one PE is allocated to each subcarrier, and a probabilistic sphere decoder with 64 PEs configured to sequentially perform parallel sphere decoding for each subcarrier, according to an embodiment of the present invention. Whilst there is a performance gain of approximately 2× when parallelization is performed by allocating one PE per subcarrier, a more significant improvement is obtained by performing probabilistic parallel sphere decoding for each subcarrier, and processing the subcarriers sequentially.

Example 2

In this embodiment, sphere decoding is performed by using sub-optimal sphere decoders which terminate the tree search when they finds the first candidate solution, which is a form of successive interference cancellation (SIC). The same MoPs as in Example 1 are employed and 'plants' are identified as described above in step S403 of FIG. 4, by identifying the C leaf nodes that are most likely to contain the solution. However, since only one leaf node will be visited in each sub-tree, the step of constructing sub-trees in FIG. 4 (S404) can be omitted. Instead, each of the C plants is used as a sub-tree, and processed using a sub-optimal sphere decoder. A processing element is allocated to each sub-tree to perform a depth-first search until the first solution is found. The final estimate can then be obtained by finding the leaf node with the minimum PD across the parallel-processed sub-trees.

Figure 11:
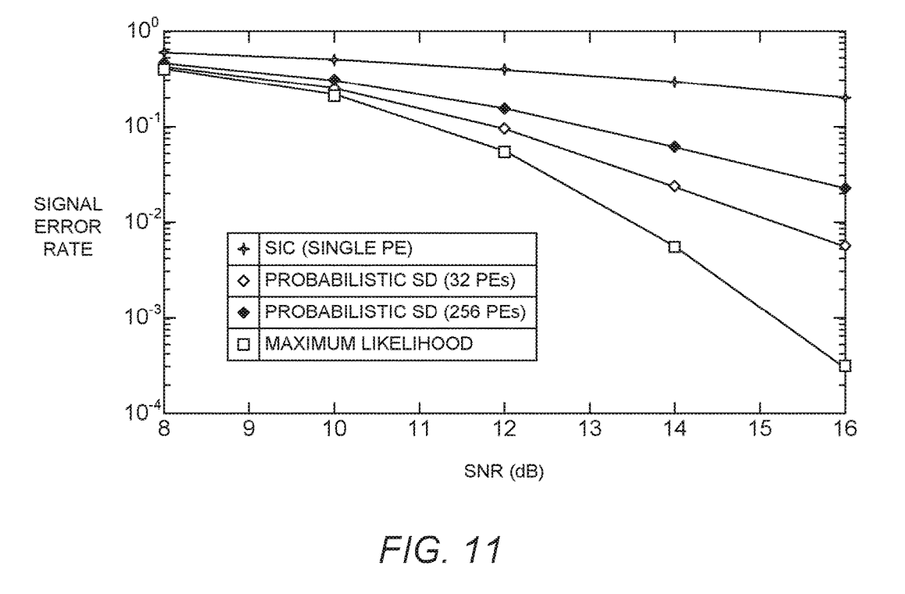
FIG. 11 is a graph plotting the SER as a function of SNR for the exact ML solution, a conventional non-parallel SIC implementation, a 32-PE parallel sphere decoder and a 256-PE parallel sphere decoder, according to an embodiment of the present invention.

FIG. 11 is a graph plotting the SER as a function of SNR for the exact ML solution, a conventional non-parallel SIC implementation, a 32-PE probabilistic sphere decoder and a 256-PE probabilistic sphere decoder, according to the present embodiment. Conventionally, sub-optimal sphere decoders have low latency but suffer from high SER, as shown in FIG. 11. However, as shown in FIG. 11, the present embodiment enables performance much closer to the ML solution to be obtained with sub-optimal sphere decoders, when a plurality of processing elements are used to perform parallel sphere decoding for different sub-trees.

Example 3

In this embodiment, K-Best sphere decoding is performed for each sub-tree. K-best sphere decoders are known in the art, and have reduced latency. However, their performance is based on the selection of their K-parameter. The choice of K may change from one level to the next in the sphere decoding tree, and is typically speculative, resulting in unnecessary complexity.

In the present embodiment, the same MoPs used in Example 1 are employed, and a search for the most promising leaf nodes is performed as in step S403 of FIG. 4. Then, the K-parameter is set separately for each level of the sphere decoding tree, by selecting the minimum K-parameter required at each level such that all visited nodes for the identified leaf nodes, at each level, will be included. In this way, the number of nodes that need to be visited when performing sphere decoding on each sub-tree is minimised.

Figure 12:
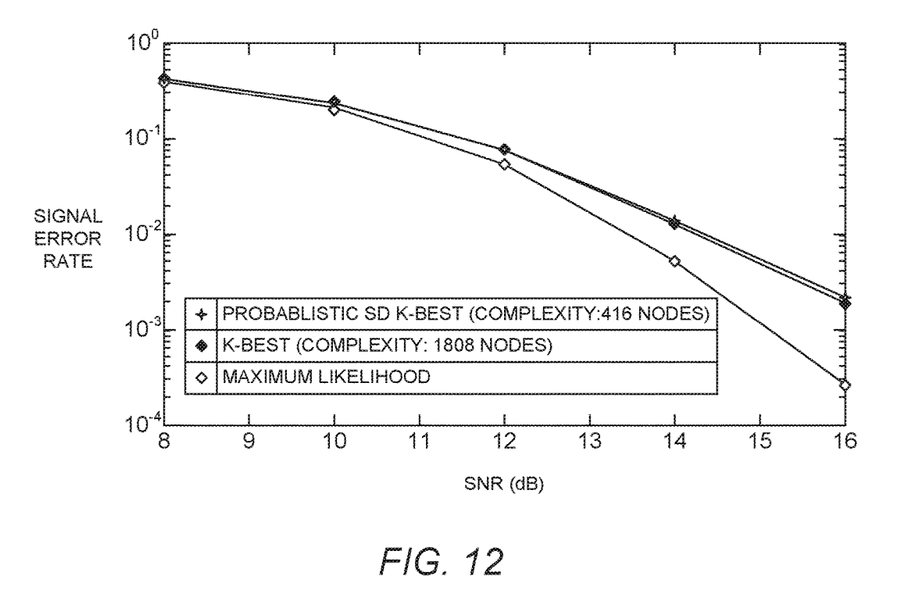
FIG. 12 is a graph plotting the SER as a function of SNR for the exact ML solution, a conventional K-Best scheme, and an adaptive K-Best scheme according to an embodiment of the present invention.

FIG. 12 is a graph plotting the SER as a function of SNR for the exact ML solution, a conventional K-Best scheme, and an adaptive K-Best scheme according to the present embodiment. As shown in FIG. 12, the adaptive K-Best scheme of the present embodiment provides virtually identical performance in terms of SER to the conventional K-Best scheme, but at a much lower complexity (416 nodes vs. 1808 nodes).

Figure 13:
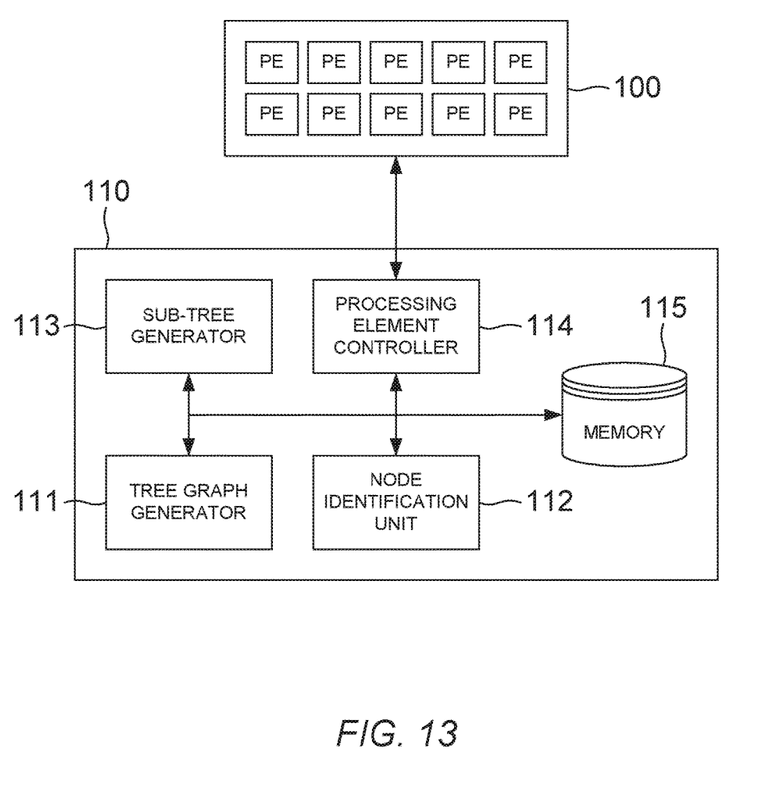
FIG. 13 schematically illustrates apparatus for finding a vector solution to a tree search problem, according to an embodiment of the present invention.

Referring now to FIG. 13, apparatus for finding a vector solution to a tree search problem is schematically illustrated according to an embodiment of the present invention. The apparatus comprises a plurality of processing elements 100, which may take various forms as described above. For example, the plurality of processing elements 100 may include a plurality of different types of processing element included in separate devices. The apparatus further comprises a control unit no for controlling the processing elements 100 to perform various tasks. The control unit no comprises a tree graph generator 111, a node identification unit 112, a sub-tree generator 113, a processing element controller 114, and computer-readable memory 115. Depending on the embodiment, any of the tree graph generator 111, a node identification unit 112, sub-tree generator 113, and processing element controller 114 may be embodied in hardware or software, for example in the form of computer program instructions stored in the memory 115.

The tree graph generator 111 is configured to construct a tree graph. The node identification unit 112 is configured to identify a plurality of nodes in the tree graph that are likely to be part of the solution to the tree graph. The sub-tree generator 113 is configured to partition the tree graph into a plurality of sub-trees, each sub-tree including one or more of the nodes identified by the node identification unit 112. The processing element controller 114 is configured to control the plurality of processing elements to process the plurality of sub-trees in parallel by allocating one or more of the processing elements to each of the sub-trees, and to determine the solution based on results of the sub-tree processing.

Embodiments of the present invention can identify the most promising nodes in the tree graph that are most likely to be part of the solution, and the most promising nodes can be distributed among the processing units by constructing sub-trees including different ones of the most promising nodes, as described above. This enables efficient parallel processing of the tree search problem since the most promising nodes are spread among the available processing units, and avoids a situation in which some processing elements are occupied in processing part of the tree graph that is unlikely to contain the solution of interest. As a result, embodiments of the present invention can efficiently determine the solution to a tree search problem by using a plurality of processing elements operating in parallel, for example in a sphere decoder or sphere encoder.

Embodiments of the invention have been described with reference to sphere decoding. However, in other embodiments of the invention the principles disclosed herein may similarly be applied to sphere encoding. For example, sphere encoding can be performed at a base station when transmitting signals in the downlink direction, in order to further reduce the transmission power by finding the optimum perturbation vector for a transmitted data vector. Accordingly, embodiments of the present invention also provide methods and apparatus for parallel sphere encoding.

Whilst certain embodiments of the invention have been described herein with reference to the drawings, it will be understood that many variations and modifications will be possible without departing from the scope of the invention as defined in the accompanying claims.

The invention claimed is:

1. A parallel-processing method of finding a vector solution to a tree search problem using a plurality of processing elements, the method comprising:
   obtaining a tree graph;
   identifying a plurality of nodes in the tree graph that are likely to be part of the solution to the tree graph;
   partitioning the tree graph into a plurality of sub-trees, each sub-tree including one or more of the identified nodes;
   processing the plurality of sub-trees in parallel by allocating one or more of the processing elements to each of the sub-trees; and
   determining the solution based on results of the sub-tree processing.

2. The method of claim 1, further comprising:
   for each one of a plurality of nodes in the tree graph, determining a metric of promise related to a likelihood of the node being part of the solution to the tree graph, wherein the plurality of nodes that are likely to be part of the solution to the tree graph are identified based on the determined metrics of promise.

3. The method of claim 1, further comprising:
   processing the tree graph using a vector search method, to obtain a list of candidate solutions, wherein the plurality of nodes that are likely to be part of the solution to the tree graph are identified from the list of candidate solutions.

4. The method of claim 1, wherein processing the plurality of sub-trees in parallel further comprises:
   determining a local solution to one of the plurality of sub-trees;
   communicating the local solution to one or more of the processing elements continuing to process other ones of the plurality of sub-trees; and
   performing tree pruning for said other ones of the plurality of sub-trees, based on the local solution to said one of the plurality of sub-trees.

5. The method of claim 1, wherein allocating one or more of the processing elements comprises:
   for each sub-tree, determining a number of nodes in the sub-tree that are shared by other ones of the sub-trees; and
   allocating the processing elements to the sub-trees by allocating more processing elements to a sub-tree with fewer shared nodes to a sub-tree with more shared nodes.

6. The method of claim 1, wherein allocating one or more of the processing elements comprises:
   determining an initial allocation of the processing elements among the sub-trees;
   starting to process the plurality of sub-trees using the initially allocated processing elements; and
   whilst processing the plurality of sub-trees, dynamically re-allocating processing elements from one of the plurality of sub-trees to another one of the plurality of sub-trees.

7. The method of claim 1, wherein information defining the sub-trees is determined in advance and stored for each one of a plurality of interference matrices, and the method further comprises:
   determining a current interference matrix for a received signal; and
   retrieving the stored information defining the sub-trees associated with one of the plurality of interference matrices which corresponds to the current interference matrix for the received signal.

8. The method of claim 2, wherein partitioning the tree graph into sub-trees comprises:
identifying one or more leaf nodes for which a value of the metric of promise is less than a threshold,
wherein the tree graph is partitioned into the sub-trees by including all identified leaf nodes in the sub-trees, and excluding other leaf nodes from the sub-trees.

9. The method of claim 8, further comprising:
identifying a number C of leaf nodes, where C is equal to the number of processing elements, by identifying the C most likely leaf nodes to contain the solution to the sphere decoding tree, based on the metrics of promise,
wherein the tree graph is partitioned into C sub-trees, each of the C sub-trees containing one of the identified C leaf nodes.

10. The method of claim 1, wherein each sub-tree is processed using K-Best sphere decoding, and prior to processing the sub-trees the method further comprises:
separately selecting a value of the K-parameter for each level of the tree graph, by selecting the minimum value required to include all visited nodes at that level for all of the identified one or more leaf nodes.

11. The method of claim 1, used for sphere decoding in a multicarrier system, the method further comprising:
performing sphere decoding for a first one of a plurality of subcarriers by performing the steps of partitioning a sphere decoding tree into a plurality of sub-trees, and processing the sub-trees in parallel by allocating one or more of the processing elements to each of the sub-trees; and
sequentially repeating the steps of partitioning the sphere decoding tree into a plurality of sub-trees and processing the sub-trees in parallel by allocating one or more of the processing elements to each of the sub-trees, for each remaining one of the plurality of subcarriers, until sphere decoding has been performed for each of the plurality of subcarriers.

12. The method of claim 1, wherein the sub-trees are processed using a sub-optimal sphere decoding algorithm, and each of the sub-trees includes a single leaf node from the sphere decoding tree.

13. The method of claim 1, wherein two or more of the processing elements are allocated to one of the sub-trees, and said one of the sub-trees is processed by partitioning the sub-tree into two or more second sub-trees, and allocating one of the processing elements to each of the two or more second sub-trees.

14. A non-transitory computer-readable storage medium on which is stored computer program instructions for finding a vector solution to a tree search problem using a plurality of processing elements, wherein when executed, the computer program instructions are configured to perform the steps of:
obtaining a tree graph;
identifying a plurality of nodes in the tree graph that are likely to be part of the solution to the tree graph;
partitioning the tree graph into a plurality of sub-trees, each sub-tree including one or more of the identified nodes;
processing the plurality of sub-trees in parallel by allocating one or more of the processing elements to each of the sub-trees; and
determining the solution based on results of the sub-tree processing.

15. Apparatus for finding a vector solution to a tree search problem, the apparatus comprising:
a plurality of processing elements;
means for obtaining a tree graph;
means for identifying a plurality of nodes in the tree graph that are likely to be part of the solution to the tree graph;
means for partitioning tree graph into a plurality of sub-trees, each sub-tree including one or more of the identified nodes; and
means for controlling the plurality of processing elements to process the plurality of sub-trees in parallel by allocating one or more of the processing elements to each of the sub-trees, and to determine the solution based on results of the sub-tree processing.

* * * * *